US012257596B2

(12) United States Patent
Lehner et al.

(10) Patent No.: US 12,257,596 B2
(45) Date of Patent: Mar. 25, 2025

(54) APPLICATION NOZZLE FOR APPLICATION OF A VISCOUS MATERIAL

(71) Applicant: Atlas Copco IAS GmbH, Bretten (DE)

(72) Inventors: Erich Lehner, Bad Friedrichshall (DE); Bernhard Sauer, Delbronn-Duerrn (DE); Tobias Rosenauer, Eberdingen-Nussdorf (DE); Christian Kammerer, Knittlingen-Hohenklingen (DE)

(73) Assignee: Atlas Copco IAS GmbH, Bretten (DE)

( * ) Notice: Subject to any disclaimer, the term of this patent is extended or adjusted under 35 U.S.C. 154(b) by 1247 days.

(21) Appl. No.: 16/975,481

(22) PCT Filed: Feb. 5, 2019

(86) PCT No.: PCT/EP2019/052799

§ 371 (c)(1),
(2) Date: Aug. 25, 2020

(87) PCT Pub. No.: WO2019/162083

PCT Pub. Date: Aug. 29, 2019

(65) Prior Publication Data

US 2021/0031229 A1 Feb. 4, 2021

(30) Foreign Application Priority Data

Feb. 26, 2018 (DE) ..................... 10 2018 104 238.8

(51) Int. Cl.
*B05C 17/005* (2006.01)
*B05C 5/00* (2006.01)
(Continued)

(52) U.S. Cl.
CPC ........ *B05C 17/00516* (2013.01); *B05C 5/001* (2013.01); *B05C 5/0216* (2013.01);
(Continued)

(58) Field of Classification Search
CPC ................................................ B05C 17/00516
(Continued)

(56) References Cited

U.S. PATENT DOCUMENTS 2,759,643 A * 8/1956 Dahlin ................ B65D 47/242
222/521
3,334,792 A 8/1967 De Vries et al.
(Continued)

FOREIGN PATENT DOCUMENTS

CN 1309589 A 8/2001
CN 1705521 A 12/2005
(Continued)

OTHER PUBLICATIONS

International Search Report in PCT/EP2019/052799, mailed Jul. 17, 2019.
(Continued)

*Primary Examiner* — Karl Kurple
(74) *Attorney, Agent, or Firm* — Collard & Roe, P.C.

(57) ABSTRACT

An application nozzle for applying a viscous material to workpieces includes a nozzle body and an application duct for the viscous material, the duct extending inside the nozzle body from a material inlet opening to a material outlet opening. At least one filler element is located in the application duct, which filler element constricts the cross-section of the application duct and extends from a first end remote from the material inlet opening to a second end at the material outlet opening.

18 Claims, 2 Drawing Sheets

Figure 1A:
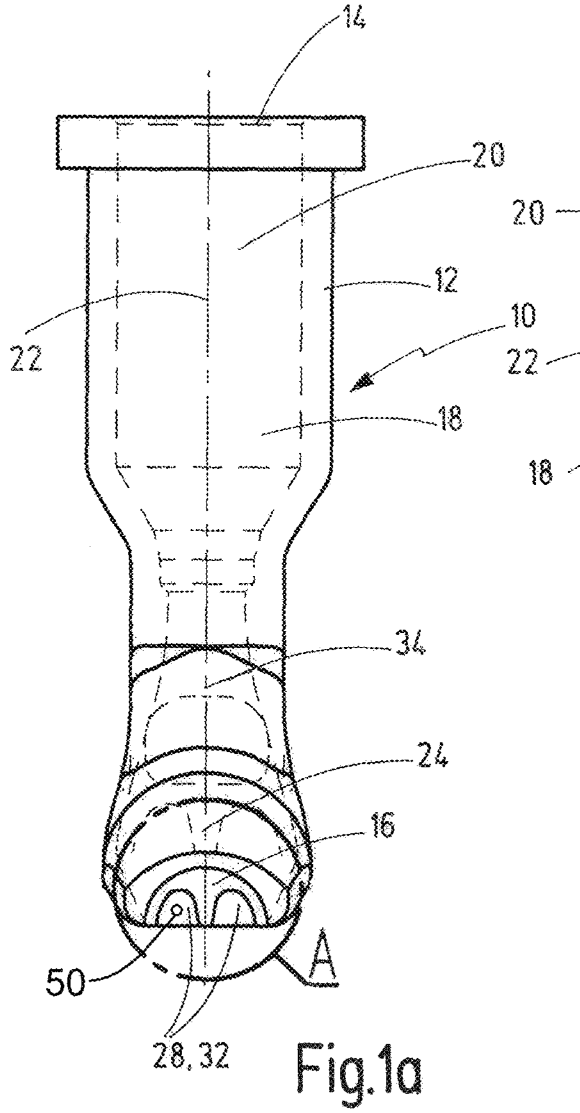

(51) Int. Cl.

| | |
|---|---|
| ***B05C 5/02*** | (2006.01) |
| ***B05C 11/10*** | (2006.01) |
| ***B05D 1/26*** | (2006.01) |
| ***B65D 47/04*** | (2006.01) |

(52) U.S. Cl.
CPC .......... *B05C 5/027* (2013.01); *B05C 11/1036* (2013.01); *B65D 47/043* (2013.01); *B05D 1/26* (2013.01)

(58) Field of Classification Search
USPC ...... 239/601, 597; 222/566, 146.2, 547, 564
See application file for complete search history.

(56) References Cited

U.S. PATENT DOCUMENTS 3,841,557 A * 10/1974 Atkinson .................. C23C 2/20 118/63
4,334,637 A * 6/1982 Baker ..................... B05C 5/001 219/230
5,289,949 A * 3/1994 Gentile ................ B65D 81/325 222/137
5,316,219 A * 5/1994 Christyson .......... B05B 13/0431 239/533.1
5,609,276 A * 3/1997 Greatbatch .......... B65D 47/242 239/506
5,620,517 A 4/1997 Saitoh
6,062,492 A * 5/2000 Tudor ................... B05B 7/0861 239/296
6,089,413 A * 7/2000 Riney ................... B05B 7/0861 222/504
6,253,957 B1 7/2001 Messerly et al.
6,537,376 B1 3/2003 Yasui et al.
7,201,336 B2 * 4/2007 Blette ................... B05B 7/2478 239/296
8,430,270 B2 4/2013 Chen et al.
8,430,588 B2 4/2013 Haack
8,875,653 B2 * 11/2014 Cobb .............. H01L 31/022433 118/313
8,893,644 B2 * 11/2014 Nakamura .............. B05B 1/044 239/592
8,978,581 B2 3/2015 Yano
9,027,799 B2 5/2015 Hanai et al.
2003/0178446 A1 9/2003 Osgood
2004/0159672 A1 * 8/2004 Auber et al. ............. B67D 5/52 222/1
2004/0226968 A1 11/2004 Lafond
2005/0104932 A1 5/2005 Tsuruoka et al.
2006/0097088 A1 5/2006 Willers et al.
2006/0104155 A1 * 5/2006 Corti ..................... B29B 7/7668 366/164.4
2009/0095825 A1 * 4/2009 Ahmadi ................ B05C 5/0237 239/570
2010/0230516 A1 * 9/2010 Solie et al. ............... B05B 7/26 239/428
2011/0315712 A1 * 12/2011 Chiba ................. B05B 11/1009 222/137
2012/0237671 A1 9/2012 Tupaika et al.
2012/0261059 A1 * 10/2012 Sherwood ......... B29C 66/43441 156/499
2014/0151400 A1 * 6/2014 Murphy ................. B65D 35/44 222/107
2019/0160484 A1 5/2019 Schnur et al.

FOREIGN PATENT DOCUMENTS

| | | | | | |
|---|---|---|---|---|---|
| CN | 101992169 | A | | 3/2011 | |
| CN | 102916529 | A | | 2/2013 | |
| DE | 197 19 045 | A1 | | 11/1998 | |
| DE | 699 12 762 | T2 | | 10/2004 | |
| DE | 10 2007 026 759 | A1 | | 12/2008 | |
| DE | 10 2009 034 774 | A1 | | 1/2011 | |
| DE | 10 2015 007 763 | A1 | | 12/2016 | |
| DE | 10 2016 008 643 | A1 | | 1/2018 | |
| EP | 2 554 276 | A1 | | 2/2013 | |
| EP | 2 597 055 | B1 | | 9/2015 | |
| JP | 2000-51765 | A | | 2/2000 | |
| JP | 2013-031805 | A | | 2/2013 | |
| JP | WO2012/011162 | A1 | | 9/2013 | |
| JP | 2014-113553 | A | | 6/2014 | |
| JP | 2017-228421 | A | | 12/2017 | |
| KR | 20100006184 | U | | 6/2010 | |
| KR | 20-0483260 | Y1 | | 4/2017 | |
| WO | 00/12223 | A1 | | 3/2000 | |
| WO | 2004/024342 | A1 | | 3/2004 | |
| WO | WO-2018012738 | A1 | * | 1/2018 | ........... B05C 17/005 |

OTHER PUBLICATIONS

German Search Report in DE 10 2018 104 238.8, dated Nov. 7, 2018, with English translation of relevant parts.
Korean Office Action dated Feb. 23, 2023 in Korean Patent Application No. 10-2020-7024670 with English translation of relevant parts.
English translation of Chinese Office Action in CN 201980014652.1, dated Sep. 5, 2022.
Chinese Office Action in CN 201980014652.1, dated May 25, 2022, with English translation.
English translation of the International Preliminary Report on Patentability and Written Opinion of the International Searching Authority in PCT/EP2019/052799, issued Sep. 3, 2020.
Chinese Office Action in CN 201980014652.1, dated Oct. 22, 2021.

* cited by examiner

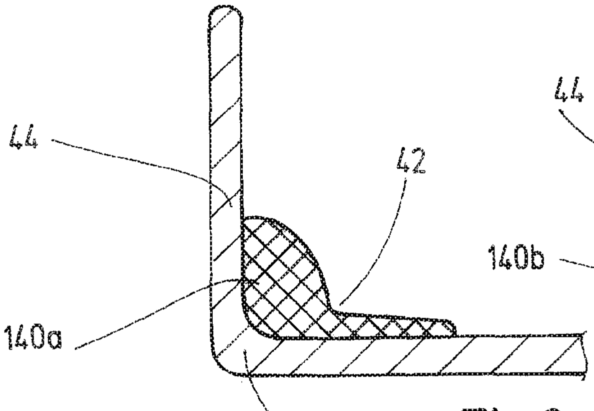
Fig.3a
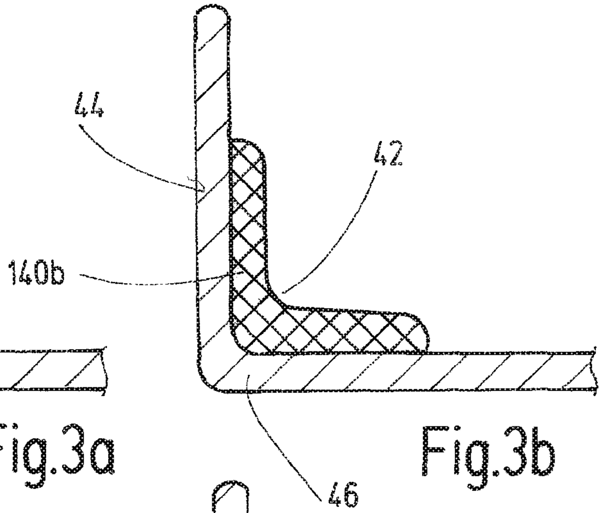
Fig.3b
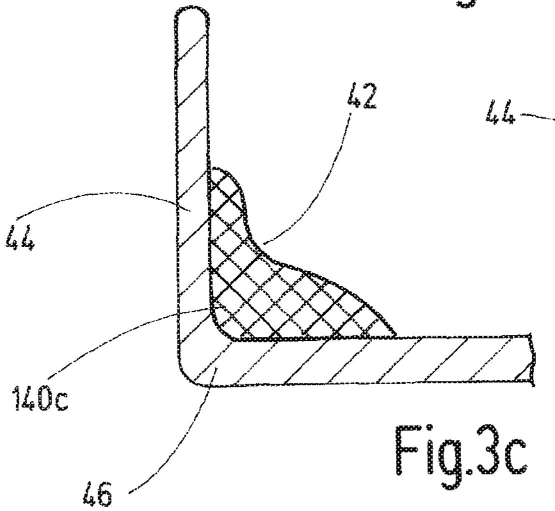
Fig.3c
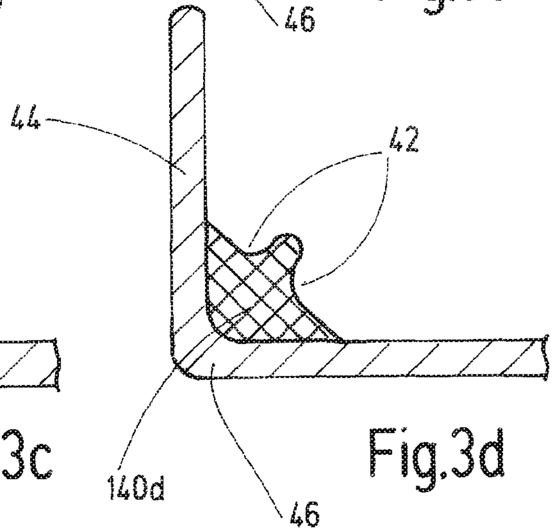
Fig.3d
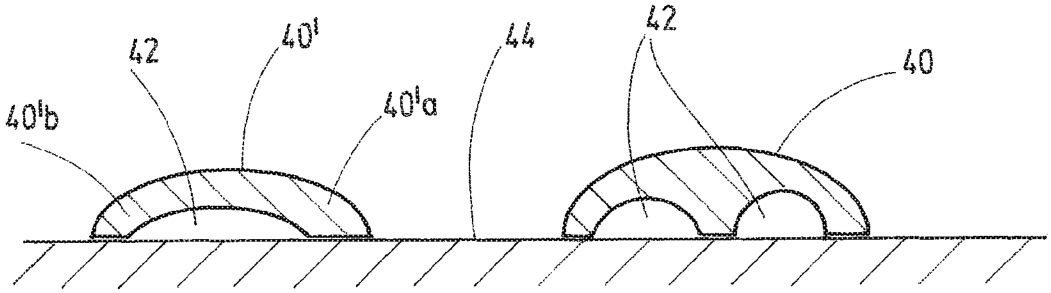
Fig.2b
Fig.2a

APPLICATION NOZZLE FOR APPLICATION OF A VISCOUS MATERIAL

CROSS REFERENCE TO RELATED APPLICATIONS

This application is the National Stage of PCT/EP2019/052799 filed on Feb. 5, 2019, which claims priority under 35 U.S.C. § 119 of German Application No. 10 2018 104 238.8 filed on Feb. 26, 2018, the disclosure of which is incorporated by reference. The international application under PCT article 21(2) was not published in English.

The invention relates to an application nozzle for application of a viscous material to workpieces, as disclosed herein.

Known application nozzles of this type find broad use in the application of viscous materials such as adhesives, sealants, insulation or heat conduction pastes to workpieces. In the automotive industry, in particular, such materials are applied to workpieces such as car body components, for example. For this purpose, the application nozzle is moved with reference to the workpiece, by means of a robot, and a metering system conducts the viscous material into the application channel, under pressure, through which it flows and exits out of the application nozzle at the material outlet opening, and is applied to the workpiece in question. In this regard, what are called round nozzles having a circular material outlet opening are generally used, so that a material strand that is approximately circular in cross-section leaves the application nozzle. The material strand applied to the workpiece in question then has a height that approximately corresponds to its width. Particularly if adhesive is applied to workpieces so as to join two workpieces together, an overly great height of the applied material strand can be disadvantageous. Less stable workpieces, in particular, can then not be pressed against one another with sufficient force so as to flatten the adhesive strand.

It is therefore the task of the invention to further develop an application nozzle of the type stated initially in such a manner that it makes the application of flatter material beads possible.

This task is accomplished, according to the invention, by means of an application nozzle having the characteristics disclosed herein. Advantageous further developments of the invention are also disclosed.

The invention is based on the idea of producing an air inclusion in the material strand by means of at least one filler body arranged in the application channel and extending all the way to the material outlet opening, so that the material strand that is applied to the workpiece is partially hollow. The cavity can be enclosed all around by the material strand or can be open toward a surface of the material strand. By means of this measure, the material strand can be compressed significantly more easily, and can be flattened in simple manner and using a lesser force when two workpieces are pressed onto one another, so as to achieve a lesser height of the material strand.

It is preferred that the at least one filler body has a cross-section that becomes greater from the first end toward the second end. In this regard, it is preferred that the cross-section of the at least one filler body continuously increases in size from the first end toward the second end, at least in certain sections. These measures are advantageous in terms of flow technology, since abrupt changes in cross-section within the application channel have a negative influence on the flow behavior of the viscous material in the application channel.

It is possible that the at least one filler body is arranged in the application channel at a distance from the nozzle body, at least over part of its length, in particular toward the second end. In the case of such an arrangement, a cavity or air inclusion that is enclosed all around is obtained in the applied material bead. However, it is preferred that the at least one filler body borders on the nozzle body directly over its entire length, and, in particular, that it is configured in one piece with the nozzle body. In this manner, the air inclusion or cavity in the material bead is open at the edge. The material bead can then, on the one hand, be applied to the workpiece in such a manner that the open edge of the air inclusion faces the workpiece, and the air inclusion is therefore delimited by the viscous material on the one side and by the workpiece on the other side, or, on the other hand, in such a manner that the open edge faces away from the workpiece.

According to an advantageous further development of the invention, two identical filler bodies, which are preferably identical in their dimensions, are arranged at a distance from one another in the application channel. In this manner, two cavities are produced in the material strand, separated from one another. According to a preferred embodiment, the cross-sections of the application channel and of the filler body or bodies add up to a semicircular surface at the material outlet opening. Particularly if two filler bodies are present in the application channel, this can lead to an M-shaped cross-section of the application channel at the material outlet opening, for one thing. If two filler bodies are present in the application channel, it is practical if they are arranged with mirror symmetry with reference to a center plane, so that the M-shaped cross-section of the application channel also has mirror symmetry at the material outlet opening.

It is preferred that the application channel is angled away between the material inlet opening and the material outlet opening, in such a manner that a longitudinal center axis of an initial section proceeding from the material inlet opening and a longitudinal center axis of an end section of the application channel that extends toward the material outlet opening enclose an acute or right angle, in particular an angle between 30° and 60°. Such a nozzle geometry is used, in particular, when the application nozzle is moved in dragging manner during material application, in other words is moved in a movement direction that is opposite the application direction in which the viscous material exits from the material outlet opening.

According to an advantageous further development, at least one heating element for heating the viscous material is arranged in the application channel. This further development according to the invention can also be implemented independently of the presence of the at least one filler body in the application channel. With this measure, the fact is taken into account that it is advantageous to heat the viscous material during application, in order to thereby reduce its viscosity and to facilitate application. This takes place, in the case of known application nozzles, in that their nozzle body is surrounded by a heating element. For reasons of space, however, the heating element can then not extend all the way to the nozzle tip at which the material outlet opening is arranged. If a heating element is arranged in the application channel, the viscous material can be heated all the way to its exit from the material outlet opening. Particularly in the case of the presence of at least one filler body in the application channel, the heating element can be arranged in the filler body.

It can furthermore be advantageous to mix an additive into the viscous material during application to the workpiece. In particular, this can be a heat-conductive additive. Viscous materials such as adhesives have poor heat conductivity and require a longer cooling phase after application to a workpiece. In the case of addition of a heat-conductive additive, the cooling period can be shortened. However, such additives are often abrasive, so that adding them leads to increased wear of the application nozzle and/or of the feed lines and/or of the metering system for the viscous material. To reduce the wear, it can therefore be provided that at least one feed line for the application of an additive, which line opens into the material outlet opening or into the application channel, is arranged in the application channel. The feed line can be produced from a more resistant material, so that it does not wear out as quickly. In particular, the metering system for the viscous material then is not impacted by the additive if the latter is mixed in only at or just ahead of the material outlet opening. Just like the heating element, the at least one feed line can advantageously run through the at least one filler body. For example, the feed line can run through one filler body, while a heating element is arranged in a second filler body. However, it is also possible to accommodate the feed line for the additive in the application channel if no filler body is present in it.

According to an advantageous further development, it is provided that the at least one heating element and/or the at least one feed line is releasably connected with the nozzle body. The heating element or the feed line can then be replaceably accommodated in the application nozzle, as wear parts.

Figure 1B:
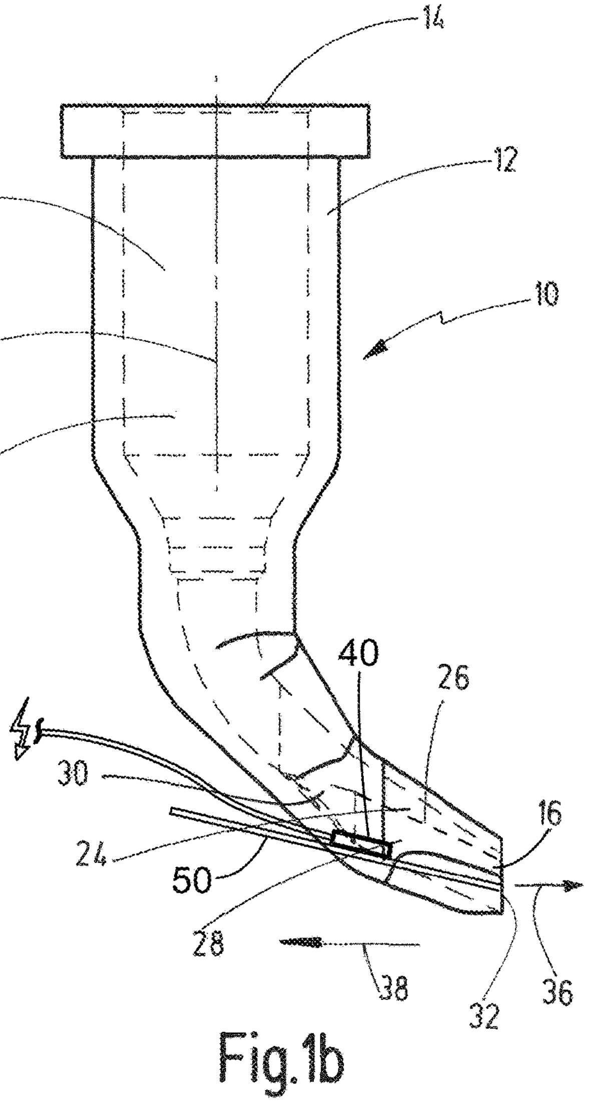
Figure 1C:
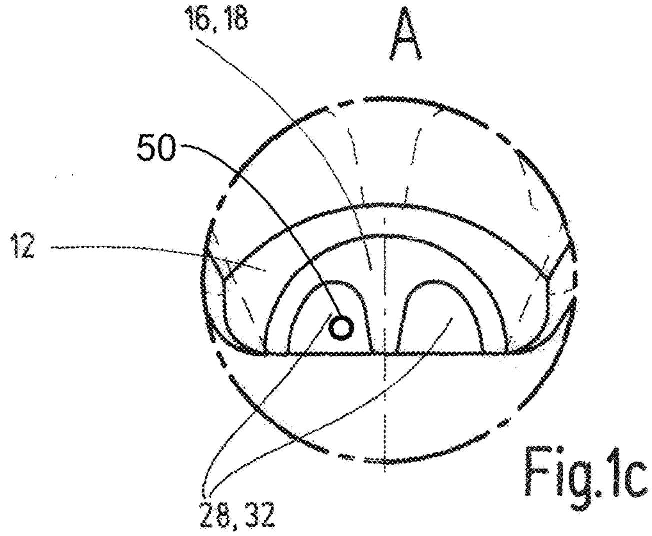

In the following, the invention will be explained in greater detail using an exemplary embodiment shown schematically in the drawing. The figures show:

FIG. 1*a*, 1*b* an application nozzle in a front view and in a side view;

FIG. 1*c* the detail A from FIG. 1*a;*

FIG. 2*a*, 2*b* a material bead applied to a workpiece, in cross-section, when using a filler body or when using two filler bodies, respectively, and FIGS. 3*a* to 3*d* four different shapes of a material bead in a fold, in cross-section.

The application nozzle 10 shown in the drawing has a nozzle body 12, in which an application channel 18 extends from a material inlet opening 14 all the way to a material outlet opening 16. The application nozzle 10 serves for application of viscous material to workpieces, wherein it is moved with reference to the workpieces, and wherein the viscous material is introduced into the application channel 18 under the impact of pressure, by way of the material inlet opening 14, and leaves this channel again at the material outlet opening 16. In this regard, the application channel 18 has an initial section 20 that extends from the material inlet opening 14, which section has a constant cross-section and extends parallel to a first longitudinal center axis 22. It furthermore has an end section 24 that ends at the material outlet opening 16, which in turn has a linear expanse parallel to a second longitudinal center axis 26, which axis runs at an acute angle to the first longitudinal center axis 22. The cross-section of the application channel 18 decreases from the initial section 20 to the end section 24. The application channel 18 is curved between the initial section 20 and the end section 24.

Two filler bodies 28 are arranged in the application channel 18, which bodies are configured in one piece with the nozzle body 12 and narrow its cross-section in the end section 24. Each of the filler bodies 28 extends from a first end 30, which is arranged at a distance from the material inlet opening 14 as well as at a distance from the material outlet opening 16, all the way to a second end 32, which is arranged at the material outlet opening 16. The two filler bodies 28 have identical dimensions and are arranged at a distance next to one another and running parallel to one another. They are furthermore arranged symmetrically with reference to a center plane 34, which stands perpendicular to the drawing plane of FIG. 1*a, c*, and runs parallel to the drawing plane of FIG. 1*b*, and which is a symmetry axis of the application nozzle 10. The cross-section of the filler bodies 28 increases continuously from the first end 30 to the second end 32. At the material outlet opening 16, the cross-sections of the application channel 18 and of the filler bodies 18 add up to a semicircular surface.

The application nozzle 10 is particularly suitable for application of a material bead to a workpiece, wherein the application nozzle 10 is moved in dragging manner. This means that the material exits from the material outlet opening 16 in an application direction 36, while the application nozzle 10 is simultaneously moved in a movement direction 38 that is opposite to the application direction 36 or at least has a directional component that runs counter to the application direction 36. A material bead 40 that is essentially M-shaped in cross-section exits from the material outlet opening 16, wherein the tips of the M are rounded off, and the bead has two cavities 42 that approximately correspond to the filler bodies 28 in cross-section. As shown in FIG. 2*a*, the material bead can be applied to a workpiece 44 in such a manner that the cavities 42 are enclosed between the viscous material and the workpiece 44.

Fundamentally, the application nozzle 10 can also be implemented with just one filler body in the application channel 18 extending all the way to the material outlet opening 16, instead of with two filler bodies 28 that run parallel to one another. As an example, FIG. 2*b* shows a corresponding material bead 40' in cross-section, which bead encloses only one cavity 42 with the workpiece 44. Such a material bead 40' can be applied, in particular, if the danger exists that it will slip away in one direction on the workpiece 44. It has a thicker main region 40'*a* and a supporting region 40'*b* that prevents slippage.

FIG. 3*a* to *d* show schematic examples of use, in which the material bead 140*a* to 140*d* is applied to respective workpiece 44 in the opposite direction, in other words with cavities 42 facing away from the workpiece 44. In this regard, FIG. 3*a* to *c* show three different exemplary embodiments, in which a filler body 28 is used for forming a cavity 42, in each instance, while FIG. 3*d* shows an exemplary embodiment in which two filler bodies 28 are used for forming two cavities 42, in accordance with the application nozzle 10 according to FIG. 1*a* to *c*. The geometry of the material bead 140*a* to 140*d* can be influenced and adapted to the respective conditions and requirements by means of a suitable selection of the cross-section of the filler bodies 28. In FIG. 3*a* to *d*, the material bead 140*a* to 140*d* fills a fold 46, in each instance.

According to further developments, the filler bodies 28 can take on additional functions. Thus, it is possible that an electrically heatable heating element 40 is used for heating the viscous material in the end section 24 in at least one of the filler bodies, which heating element 40 is accommodated there in fixed or removable manner. Likewise, it is possible that a feed line 50 for a particularly abrasive additive extends through at least one of the filler bodies 28, which feed line 50 ends either in the end section 24 or in the material outlet opening 16. The feed line 50 can also be firmly integrated into the respective filler body 28 or removably arranged in it, so that it can be replaced in case of wear.

In summary, the following should be stated: The invention relates to an application nozzle 10 for application of a viscous material to workpieces 44, having a nozzle body 12 and having an application channel 18 for the viscous material that extends in the nozzle body 12 from a material inlet opening 14 all the way to a material outlet opening 16. It is provided, according to the invention, that at least one filler body 28 that narrows the cross-section of the application channel 18, extending from a first end 30 arranged at a distance from the material inlet opening 14 all the way to a second end 32 arranged at the material outlet opening 16 is arranged in the application channel 18.

The invention claimed is:

1. An application nozzle for application of a viscous material in the form of a material bead to workpieces, the application nozzle having a nozzle body and having an application channel for the viscous material, wherein the application channel extends in the nozzle body from a material inlet opening to a material outlet opening, wherein at least one filler body is arranged in the application channel and narrows the cross-section of the application channel, wherein the at least one filler body borders on the nozzle body directly over an entire length of the at least one filler body, the at least one filler body extending from a first end of the at least one filler body arranged at a distance from the material inlet opening to a second end of the at least one filler body; said second end is arranged at the material outlet opening in the application channel so that the viscous material flows around an outside of at least one filter body to form a cavity in the material bead of the viscous material when the material bead exits from the material outlet opening; and wherein the at least one filler body has a cross-section that increases in size from the first end of the at least one filler body to the second end of the at least one filler body.

2. The application nozzle according to claim 1, wherein the cross-section of the at least one filler body increases in size continuously in a direction from the first end to the second end.

3. The application nozzle according to claim 1, wherein the at least one filler body is configured in one piece with the nozzle body.

4. The application nozzle according to claim 1, wherein the application nozzle comprises two filler bodies that are arranged in the application channel at a distance from one another.

5. The application nozzle according to claim 1, wherein the cross-sections of the application channel and the at least one filler body add up to a semicircular surface at the material outlet opening.

6. The application nozzle according to claim 4, wherein the cross-section of the application channel is M-shaped at the material outlet opening.

7. The application nozzle according to claim 4, wherein the two filler bodies are arranged in the application channel with mirror symmetry to each other with respect to a center plane which is an axis of symmetry of the application channel.

8. The application nozzle according to claim 1, wherein the application channel is angled away between the material inlet opening and the material outlet opening, in such a manner that a longitudinal center axis of an initial section proceeding from the material inlet opening and a longitudinal center axis of an end section of the application channel that extends toward the material outlet opening enclose an acute angle or a right angle.

9. The application nozzle according to claim 1, wherein at least one heating element for heating the viscous material is arranged in the application channel.

10. The application nozzle according to claim 9, wherein the at least one heating element is arranged in the at least one filler body.

11. The application nozzle according to claim 1, wherein at least one feed line for an application of an additive, wherein the at least one feed line opens into the material outlet opening or into the application channel, is arranged in the application channel.

12. The application nozzle according to claim 11, wherein the at least one feed line runs through the at least one filler body.

13. The application nozzle according to claim 9, wherein the at least one heating element and/or the at least one feed line is releasably connected with the nozzle body.

14. A method for application of a viscous material to workpieces, using the application nozzle according to claim 1, wherein the viscous material exits from the material outlet opening in an application direction, wherein the application nozzle is moved, during material application, in a movement direction that is opposite to the application direction or at least has a component that runs counter to the application direction.

15. The method according to claim 14, wherein the application nozzle comprises a number of filler bodies, wherein the viscous material exits from the material outlet opening in the application direction to form the material bead that extends in the application direction, and wherein the material bead has a number of cavities that are open at an edge of the material bead and extend in the application direction, wherein the number of cavities corresponds to the number of filler bodies.

16. The method according to claim 15, wherein the material bead is applied with each cavity of the number of cavities facing the respective workpiece.

17. The method according to claim 15, wherein the material bead is applied in a fold of the respective workpiece, with each cavity of the number of cavities facing away from the workpiece.

18. The application nozzle according to claim 4, wherein the two filler bodies are identical in dimensions.

* * * * *